United States Patent Office 3,406,191
Patented Oct. 15, 1968

3,406,191
METHOD OF PRODUCING METHYL
ISOTHIOCYANATE
Horst Werres, Berlin, Germany, assignor to
Schering AG., Berlin, Germany
No Drawing. Continuation of application Ser. No.
67,463, Nov. 7, 1960. This application Dec. 7,
1964, Ser. No. 416,598
Claims priority application Germany, Nov. 6, 1959,
Sch 26,924
3 Claims. (Cl. 260—454)

ABSTRACT OF THE DISCLOSURE

Methyl isothiocyanate is produced by reacting methyl-chloro-carbonate at a temperature of between about 35 and 60° C. with an alkali metal or ammonium salt of N-methyldithiocarbamic acid, preferably followed by steam distillation of the thereby formed methyl isothiocyanate.

---

This application is a continuation of my copending application Ser. No. 67,463, filed Nov. 7, 1960, now abandoned, for "Method of Producing Methyl Isothiocyanate."

The present invention relates to production of methyl isothiocyanate, and more particularly to the production thereof in high yield with duplicatable results.

Numerous methods have been proposed for the production of methyl isothiocyanate. However, all of the processes are for one reason or another not suitable under technical commercial conditions since most of the processes give very low yields or suffer from other disadvantages.

Several decades ago it was proposed to produce methyl isothiocyanate by reacting sodium N-methyl-dithiocarbamic acid with ethyl-chloro-carbonate. However, the product obtained by this process was extremely impure and although it has been indicated that yields of methyl isothiocyanate as high as 70–76% have been obtained, such yields could not be reproduced in practice.

The product obtained by this process is partly liquid and partly solid, and in addition exhibits a carbon content which is about 10% too high.

Thus, despite the fact that in recent times there has been an increased use of the methyl isothiocyanate for the protection of plants, so that the product has achieved an increased commercial importance, the methods of producing the same have been rather unsatisfactory and no use whatsoever has been made of the reaction of sodium N-methyldithiocarbamic acid with ethyl-chloro-carbonate.

It is accordingly a primary object of the present invention to provide a new method of producing methyl isothiocyanate which method results in the product being produced in high yield.

It is another object of the present invention to provide a commercially satisfactory method of producing methyl-isothiocyanate which avoids all of the disadvantages of the known methods of producing the compound.

It is yet another object of the present invention to provide a method of producing methyl isothiocyanate which while being similar to the reaction of sodium N-methyl-dithiocarbamic acid with ethyl-chloro-carbonate avoids all of the disadvantages of this reaction and provides for a commercially satisfactory method of producing methyl isothiocyanate in high yield.

Other objects and advantages of the present invention will be apparent from a further reading of the specification.

It has been found that methyl isothiocyanate can be produced in yields which could not be attained by prior known processes, and furthermore, that when the process is carried out under technical commercial conditions the yields are reproducible, by reacting methyl-chloro-carbonate with an alkali metal or ammonium salt of N-methyl-dithiocarbamic acid. The reaction is preferably carried out at a temperature of 35–60° C., although it is possible to increase the temperature even above this range as high as about the boiling point of the methyl-chloro-carbonate at 70–72° C., to give the unexpectedly high yields of the present invention.

Perfectly reproducible yields of 83% are achieved by this method. In addition, the method of the present invention has the advantage that the separation of the product can be accomplished very nicely and without damage to the product directly from the reaction vessel with steam without separation of the mother liquor.

The reaction of the present invention proceeds in accordance with the following general equation:

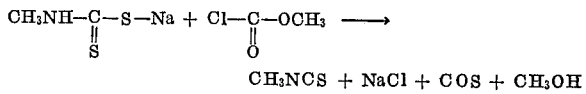

$$CH_3NCS + NaCl + COS + CH_3OH$$

The following example is given to further illustrate the present invention. The scope of the invention is not, however, meant to be limited to the specific details of the example:

EXAMPLE (A) The production of sodium N-methyl-dithiocarbamic-acid

The apparatus used is a tri-necked 1 liter round bottomed flask with a KPG stirrer and provided with a separatory funnel, thermometer and reflux condenser.

40 g. of NaOH in 90 cc. of water (1 mol) and 31 g. of $CH_3NH_2$ in the form of a 33% aqueous solution (1 mol) are introduced into the flask and during a period of 20 to 30 minutes at a temperature of approximately 20° C. 76 g. of $CS_2$ are added dropwise under cooling. The reaction mixture is then stirred further until a clear solution is formed (approximately 1–2 hours).

(B) The production of methylisothiocyanate

The apparatus used is the same as in the above. The solution obtained according to the above is subjected to a content determined by means of the known xanthogenateiodine-method, if necessary neutralized with hydrochloric acid and then there is added thereto dropwise and under stirring during a period of approximately 30 minutes 99.2 g. (5% excess, the amount calculated for 1 mol) of methyl-chloro-carbonate ester. The temperature is maintained at between about 35 and 40° C. (by cooling with ice water). The reaction mixture is then further stirred for 1 hour at a temperature of 50–60° C. (at the end of the reaction the temperature can be permitted to increase). The crude oil settles on top and can be directly distilled off from the reaction vessel by means of steam. The yield of methyl isothiocyanate is 82–84%.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed and desired to be secured by Letters Patent is:

1. Method of producing methyl isothiocyanate, which comprises reacting methyl-chloro-carbonate with a substance selected from the group consisting of alkali metal and ammonium salts of N-methyl-dithiocarbamic acid at a temperature of about 35–60° C., thereby forming a reaction mass including methyl isothiocyanate; and steam distilling off said methyl isothiocyanate.

2. Method of producing methyl isothiocyanate which comprises reacting methyl-chloro-carbonate with a substance selected from the group consisting of alkali metal and ammonium salts of N-methyl-dithiocarbamic acid in aqueous medium at a temperature of about 35–60° C.; and directly recovering said methyl isothiocyanate.

3. Method of producing methyl isothiocyanate which comprises reacting methyl-chloro-carbonate with a substance selected from the group consisting of alkali metal and ammonium salts of N-methyl-dithiocarbamic acid in aqueous medium at a temperature of about 35–60° C., thereby forming a reaction mass including methyl isothiocyanate; and steam distilling off said methyl isothiocyanate.

References Cited

UNITED STATES PATENTS

| 2,866,804 | 12/1958 | Nischk et al. | 260—454 |
| 2,894,013 | 7/1959 | Werres et al. | 260—454 |

OTHER REFERENCES

Kaluza: Monatshefte fur Chemie, vol. 33, 1912, pp. 363—371.

CHARLES B. PARKER, *Primary Examiner.*

D. H. TORRENCE, *Assistant Examiner.*